(No Model.)
J. A. BORTHWICK.
Ice Cream Freezer.
No. 230,856. Patented Aug. 10, 1880.
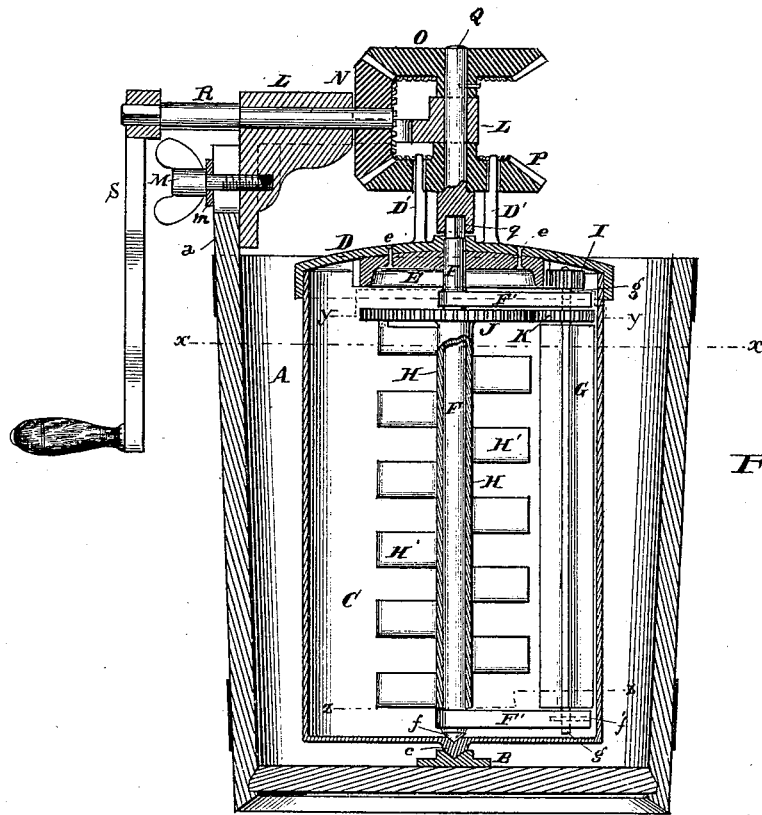
Fig. 1
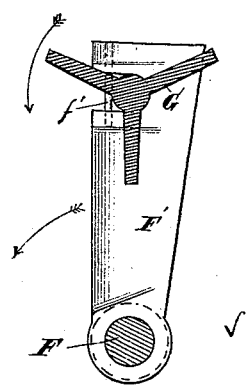
Fig. 4
Fig. 2
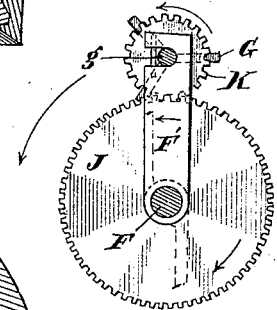
Fig. 3
Attests:
Davis
Henry A. Brown
Inventor
John A. Borthwick
By his atty

UNITED STATES PATENT OFFICE.

JOHN A. BORTHWICK, OF ATLANTIC CITY, NEW JERSEY.

ICE-CREAM FREEZER.

SPECIFICATION forming part of Letters Patent No. 230,856, dated August 10, 1880.

Application filed May 22, 1880. (No model.)

*To all whom it may concern:*

Be it known that I, JOHN A. BORTHWICK, of Atlantic City, county of Atlantic, and State of New Jersey, have invented an Improvement in Ice-Cream Freezers, of which the following is a specification.

My invention relates to ice-cream freezers in general, but more particularly to those in which the can rotates in one direction and the mixer or scraper rotates in the opposite direction, both revolving about the same axial line; and my invention consists in certain constructions of the mixer and scraper, whereby they have independent movements given them, and which constructions are fully set forth in the following specification, referred to in the appended claims, and shown in the accompanying drawings.

The object of my invention is to so construct an ice-cream freezer that the mixer and scraper, by their peculiar construction and operation, will cause the cream to solidify or be brought to a state of consistency in a shorter space of time than that required with freezers at present in use.

Ice-cream freezers have been made with an open mixer or beater which rotates upon its own axis in the direction of revolution of the can, and at the same time the beater rotates about the axis of the can, the beater being located between the axis of the can and the rigid scraper next to the wall of the can; but a vaned scraper and mixer combined has never been used before, nor its combination with a rotating horizontal-armed beater or mixer, as set forth in this specification; neither have the peculiar motions given to the parts in this freezer ever been given to a machine of this class.

In the drawings, Figure 1 is a vertical section of my improved ice-cream freezer on the line $v\ v$ of Fig. 2. Fig. 2 is a cross-section of same on the line $x\ x$. Fig. 3 is a cross-section of the mixer and scraper on the line $y\ y$. Fig. 4 is a cross-section of the scraper on the line $z\ z$.

A is the usual wooden bucket or tub, and is provided in the middle of the bottom with a foot-rest, B. Situated within the interior of the tub A is the can C, which contains the cream to be frozen. The bottom of this can is provided with a conical foot, $c$, which rests upon the plate B. The top of the can C is fitted with a cover, D, provided with two uprights, D' D'. The gear-wheel E is secured to the inside of the cap or cover D by rivets $e\ e$, or it may be cast solid with it.

Passing through the cover D, and pivoted at $f$ in the bottom of the can C, is a rod or shaft, F, which is provided with arms F' F'. The upper part of this rod or shaft F is made square to fit into a corresponding hole, $q$, in the bottom of shaft Q.

Secured in the outer ends of the arms F' F', and free to revolve therein, is a vaned scraper, G, the shafts $g$ of which work in bearings in the arms F' F'.

Secured upon the shaft $g$, at the top, is a pinion, I, which meshes with the gear-wheel E in the cover D, and secured to the same shaft, immediately below the arm F', is another pinion, K, preferably of larger diameter than the upper one, I.

Inclosing and working upon the shaft is a sleeve, H, which carries at the top a pinion, J, which meshes with pinion K, and has projecting from it on either side arms H' H', designed to mix the cream.

Attached to the projection $a$ of the tub A, by the thumb-screw M, is a bearing-casting, L, which carries the shaft Q, to which the bevel-gear O is secured and upon which the bevel-wheel P is free to rotate. The bevel-gear P is provided with slots, through which the arms D' D' project, and by which the can C is rotated. The casting L also carries a shaft, R, one end of which is fast to a bevel-gear wheel, N, which meshes with the bevel-wheels O and P, and the other end of which is furnished with a crank, S, with which to drive the gearing and work the freezer.

The operation is as follows: The crank S is revolved, rotating the bevel-gears O and P in opposite directions, and also the shaft F and can C. As the scraper G revolves about the central axis of the machine, the pinion I, meshing with the gear-wheel E, causes it to rotate about its own axis $g$ and independently to its motion about the axis of the machine. As the scraper G rotates it causes the mixing-arms H' to rotate about the axis of the machine, and in an opposite direction to the rotation of the scraper and the arms F' F', but in the same direction with the can C. By these movements of the mixer and scraper the position of the cream is thoroughly moved about and every part of the same is quickly brought in contact with the surface of the can. The scraper G also mixes the cream, but as it performs the function of scraping the cream from the side of the can I have called it the "scraper" to distinguish it from the mixer.

The motions of the various parts are indicated by arrows in the various figures of the drawings.

Having now described my invention, what I claim as new, and desire to secure by Letters Patent, is—

1. In an ice-cream freezer, a three or more vaned scraper and mixer combined, in combination with mechanism to rotate it about the axis of the can and at the same time upon its own axis, and in both cases in an opposite direction to the movement of the can, substantially as described, and for the purpose of scraping the cream from the side of the can and throwing it to the center.

2. In an ice-cream freezer, the combination of can C, gear-wheel E, shaft F, provided with arms F' F', a mixer composed of sleeve H and arms H' H', pinions I and K, radial-vaned scraper G, and pinion J, all constructed substantially as and for the purpose specified.

3. In an ice-cream freezer, the combination of can C, gear-wheel E, shaft F, provided with arms F' F', pinion I, and radial-vaned mixer and scraper G, substantially as and for the purpose specified.

4. In an ice-cream freezer, the combination of can C, gear-wheel E, shaft F, pinions I and K, pinion J, attached to the mixer, and a mixer provided with arms H' H', substantially as and for the purpose specified.

5. In an ice-cream freezer, the combination of can C, gear-wheel E, shaft F, provided with arms F' F', pinion I, radial-vaned scraper G, and a mixer attached to the shaft F, substantially for the purpose specified.

In testimony of which invention I hereunto set my hand.

JOHN A. BORTHWICK.

Witnesses:
  D. W. GARRIGUES,
  SAMUEL E. CAVIN.